United States Patent [19]

Koff et al.

[11] 4,202,765

[45] May 13, 1980

[54] HYDROXYLAMINE PURIFICATION VIA CATION EXCHANGE

[75] Inventors: Fred W. Koff, Long Valley; Allen A. Tunick, Boonton; Stylianos Sifniades, Madison; Reed H. Belden, Bernardsville, all of N.J.

[73] Assignee: Allied Chemical Corporation, Morris Township, Morris County, N.J.

[21] Appl. No.: 947,321

[22] Filed: Oct. 4, 1978

Related U.S. Application Data

[63] Continuation-in-part of Ser. No. 846,660, Oct. 28, 1977, abandoned.

[51] Int. Cl.$^2$ .............................................. B01D 15/04
[52] U.S. Cl. .................................. 210/31 R; 210/34; 210/38 R; 423/387
[58] Field of Search ................... 210/24, 30 R, 31 R, 210/32, 34, 37 R, 38 R; 423/387, 388

[56] References Cited

U.S. PATENT DOCUMENTS

| 3,105,741 | 10/1963 | Moore et al. | 423/387 |
| 3,695,834 | 10/1972 | Wheelwright | 423/395 |

FOREIGN PATENT DOCUMENTS

| 1247284 | 8/1967 | Fed. Rep. of Germany | 423/387 |
| 49-14640 | 9/1974 | Japan | 423/387 |

*Primary Examiner*—Charles N. Hart
*Assistant Examiner*—Ivars Cintins
*Attorney, Agent, or Firm*—Horst M. Kasper; Robert A. Harman

[57] ABSTRACT

A process for separating hydroxylamine from an aqueous solution containing hydroxylammonium salts in mixture with salts of predominantly monovalent cations whose corresponding free bases have base dissociation constants greater than $10^{-7}$. Said solution is passed through a bed of cation exchange resin loaded predominantly with monovalent cations whereby hydroxylammonium and the other cations in solution substantially displace said cations from the resin. A second aqueous solution containing a monovalent amine or hydroxide base of at least 0.5 molar concentration having a dissociation constant greater than $10^{-7}$ is passed through the resin bed whereby hydroxylamine is preferentially released to the solution and the resin is correspondingly loaded with the cation of said base. Hydroxylammonium salts can be crystallized from the solution after addition of a stoichiometric amount of an appropriate acid.

16 Claims, No Drawings

HYDROXYLAMINE PURIFICATION VIA CATION EXCHANGE

RELATED OR CO-PENDING APPLICATION

This application is a continuation-in-part of Application Ser. No. 846,660, filed Oct. 28, 1977, now abandoned.

FIELD OF THE INVENTION

This invention relates to a process of separating hydroxylamine from accompanying impurities in an aqueous system.

BACKGROUND OF THE INVENTION

Hydroxylamine is prepared commercially by the Raschig process or variations thereof in which ammonium or sodium nitrite are reacted in aqueous solution with ammonium or sodium bi-sulfite and sulfur dioxide and the resulting disulfonate salts are subsequently hydrolyzed to a solution containing essentially hydroxylammonium sulfate, sulfuric acid, ammonium sulfate and/or sodium sulfate plus minor amounts of the corresponding nitrates. This solution can be used, after neutralization with ammonia, as a source of hydroxylamine, e.g. for the synthesis of oximes from ketones. However, there is no simple method for isolating pure hydroxylamine or pure hydroxylammonium salts from the mixture.

One method for obtaining pure hydroxylammonium salts consists of utilizing the hydroxylammonium containing mixture to synthesize an oxime from a ketone, separating the oxime from the spent solution and hydrolyzing this oxime with a strong mineral acid to recover hydroxylammonium salt and the ketone which can be recycled. This method uses long periods of heating for the hydroylsis and requires expensive equipment for the separation of the oxime from the spent solution and of the hydroxylammonium salt from the ketone. Moreover, salts of hydroxylamine with weak or oxidizing acids cannot be prepared by this method because these acids either do not effect hydrolysis of oximes or decompose the hydroxylammonium salt formed during hydrolysis. Salts of such acids can be prepared by neutralizing cold solutions of hydroxylamine with the corresponding acid.

Heinz Holzapfel in Z. Anorg. und Allgem. Chemie, Vol. 288, page 28 (1956) describes the preparation of hydroxylamine from hydroxylammonium salts by employing an anion exchange resin in the OH form. This publication does not relate to the separation of hydroxylamine from solutions containing other cations. As disclosed in U.S. Pat. No. 3,508,864 issued Apr. 28, 1970 to Wallace T. Thompson et al., hydroxylammonium perchlorate can be produced either by liberating hydroxylamine from a hydroxylammonium salt by passage through an anion exchange resin and neutralizing with perchloric acid, or by absorbing hydroxylammonium ion on a cation exchange resin and then passing perchloric acid through the resin. This method does not separate hydroxylamine from other cations. A cation exchange method is described by Earl J. Wheelwright in Industrial Engineering Chemistry Process Design Development, Vol. 16 No. 2 (1977), page 220 for the preparation of hydroxylammonium nitrate. This method does not separate hydroxylamine from other cations and moreover the resulting solution of hydroxylammonium nitrate contains significant amounts of nitric acid.

While the prior art describes methods for the preparation of hydroxylamine and hydroxylammonium salts, there is a need for a simple and inexpensive process for separating hydroxylamine from solutions containing salts of other cations.

SUMMARY OF THE INVENTION

We have found that when an aqueous solution of hydroxylammonium salts in mixture with salts of other monovalent cations is passed through a cation exchange resin loaded with monovalent cations, hydroxylammonium ions and the other cations in the solutions are absorbed by the resin. When an aqueous solution of a base with dissociation constant greater than $10^{-7}$ is passed through the resin, hydroxylamine is preferentially released to solution. Hydroxylammonium salts can be crystallized from the solution after addition of a stoichiometric amount of an appropriate acid.

In an embodiment of the invention, a solution containing hydroxylammonium sulfate and nitrate, ammonium sulfate and nitrate and sulfuric acid is passed through a sulfonic acid resin loaded with ammonium ions. Hydroxylammonium ions and protons are loaded on the resin by displacing some of the ammonium ions. An aqueous solution of ammonia is then passed through the resin which releases hydroxylamine to the solution while at the same time the resin is loaded with ammonium ions. Hydroxylamine sulfate is isolated by neutralizing the hydroxylamine solution with sulfuric acid, optionally after first removing by evaporation small amounts of ammonia which may be present.

DETAILED DESCRIPTION OF THE INVENTION

The present invention effects the isolation of hydroxylamine from aqueous solutions containing hydroxylammonium salts in mixture with salts of other cations by means of cation exchange. In a narrower embodiment this invention effects the isolation of hydroxylamine from aqueous solutions containing essentially hydroxylammonium sulfate, ammonium sulfate and sulfuric acid, such as are obtained by the Raschig synthesis of hydroxylamine.

For the isolation of hydroxylamine by cation exchange, advantage is taken of the relatively weak basicity of hydroxylamine, which has a base dissociation constant of about $1 \times 10^{-8}$ at ambient temperature. At pH below about 4, such as exists in the technical mixtures resulting from the Raschig process, hydroxylamine is fully converted to hydroxylammonium ion and competes on about equal terms with other monovalent cations for the exchange sites of a cation exchange resin. Therefore, when such a solution is passed through a cation exchange resin loaded with other monovalent ions hydroxylammonium ion can displace these ions. Polyvalent cations on the other hand have generally higher affinities for the exchange sites of the resin and are more difficult to displace by hydroxylammonium ions although mass action effects can still be applied. For this reason the present invention is ordinarily applied to the separation of hydroxylamine from solutions containing polyvalent cations in equivalent amounts less than about 10% of the equivalents of hydroxylammonium ion present in solution. Anions present in solution do not occupy exchange sites on the cation exchange resin, therefore the nature of said anions is not of importance to the process of the present invention.

Initially the cation exchange resin bed can be loaded with monovalent cations such as those present in the feed solutions containing hydroxylamine. After hydroxylammonium ion has been "loaded" or fed onto the resin it is important to wash the resin with water in order to remove anions and also excess cations which do not occupy resin exchange sites. An aqueous solution of a monovalent base stronger than hydroxylamine, e.g. with a base dissociation constant of at least $10^{-7}$, is then passed through the resin and displaces hydroxylamine. If a cation whose corresponding base has dissociation constant less than $10^{-7}$ is loaded on the resin, this cation will also be largely displaced by the base used to displace hydroxylamine. For this reason such cations cannot be effectively separated from hydroxylamine by the present invention. The aqueous solution of hydroxylamine obtained may be used as a source of hydroxylamine without further treatment, or it may be neutralized with an acid and the corresponding hydroxylammonium salt isolated.

For the method of the present invention all types of cation exchange resins are suitable, e.g. sulfonic, phosphonic or carboxylic types. Sulfonic resins are preferred because they have a very low affinity for protons and consequently it is possible to use directly as feed the relatively strongly acidic technical solutions available through the Raschig process. If a carboxylic or phosphonic resin is used it is generally desirable to neutralize the feed solution to pH about 4; otherwise protons take precedence over hydroxylammonium ions in occupying resin exchange sites.

For displacing hydroxylamine from the resin, any water soluble monovalent amine or hydroxide base with a base dissociation constant of at least $10^{-7}$ can be used. Polyvalent bases are less suitable because their cations have great affinity for the exchange sites of the resin and therefore cannot be readily displaced by hydroxylammonium ion is a subsequent loading cycle.

Suitable bases are for example, sodium hydroxide, potassium hydroxide, lithium hydroxide and the like; methylamine, ethylamine, dimethylamine, diethylamine and the like. The preferred base is ammonia which has the advantages of being relatively inexpensive, non-toxic, of low molecular weight and volatile. Moreover, the by-product obtained when ammonia is used as a base for the recovery of hydroxylamine from a mixture of sulfate salts is ammonium sulfate, which is valuable as a fertilizer.

The volatility of ammonia also allows the use of a slight excess of ammonia in order to displace hydroxylamine completely from the resin because small amounts of ammonia that will contaminate the product hydroxylamine during this operation can easily be removed by evaporation. We have found, however, that it is possible to obtain essentially ammonia-free hydroxylamine solutions directly from the resin by using a deficient amount of ammonia to displace hydroxylamine.

The aqueous base solution which is used to remove hydroxylamine from the ion exchange resin during the unloading step may optionally contain hydroxylamine. In that case, the eluent which is thereafter finally obtained by subquently washing the resin bed with water, contains hydroxylamine at a concentration which is substantially higher than the concentration obtained if no hydroxylamine were present in said aqueous base solution. This effect allows the recovery of relatively concentrated hydroxylamine liquors in a cyclic process by simply recycling part of the hydroxylamine product solution to the unloading step of the next cycle after mixing with a base.

The present invention is applicable within widely varying process parameters, although limitations of a practical nature exist. The hydroxylammonium ion concentration in the mixture from which it is desired to isolate hydroxylamine is of little consequence. Concentrations from $10^{-4}$ M up to saturation may be employed. Of higher importance is the mole fraction of hydroxylammonium cation relative to the other cations in the mixture because all cations compete for resin exchange sites. Although it is possible to retain small amounts of hydroxylammonium ion from mixtures containing a very small mole fraction thereof, for practical purposes it is desirable to have mole fractions of hydroxylammonium ion greater than 0.05 and preferably greater than 0.10. The concentration of the aqueous base used to displace hydroxylamine from the resin is not critical, however, concentrations higher than 0.5 molar and preferably higher than 1 molar are used in order to obtain relatively concentrated solutions of hydroxylamine. The process of the present invention can be practiced at any temperature between the freezing point and the boiling point of the solutions used. A preferred range is between about 25° C. and 80° C., and more preferred is a range between about 35° C. and 65° C.

The application of this invention is further described for a preferred embodiment of the process, i.e. the isolation of hydroxylamine from a mixture of hydroxylammonium and ammonium sulfates and sulfuric acid obtained by the Raschig process using an ammonium sulfonate resin. Reaction (1) represents the displacement of the ammonium ion by hydroxylammonium ion during the loading operation. The equilibrium constant for this reaction is about 0.8 to 1.3. Reaction (2) represents the displacement of the ammonium ion by proton during loading. This is an undesirable reaction, however the equilibrium constant is only about 0.25. During loading there is also displacement of ammonium ions from the resin by ammonium ions in the solution but this reaction has no net effect. Reaction (3) represents the displacement of hydroxylamine by ammonia when aqueous ammonia is passed through the loaded resin. The equilibrium constant for this reaction is approximately equal to the ratio of the base dissociation constant of ammonia to the base dissociation constant of hydroxylamine multiplied by the equilibrium constant of reaction (1), therefore it is about 2,000. It can be seen that displacement of hydroxylamine by ammonia is a very favorable reaction. Reaction (4) represents the neutralization of free sulfonic acid sites that takes place when aqueous ammonia is passed through the loaded resin. This is essentially a non-reversible reaction and takes precedence over reaction (3).

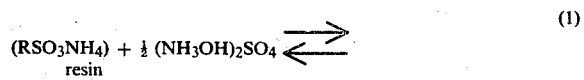

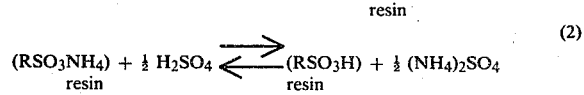

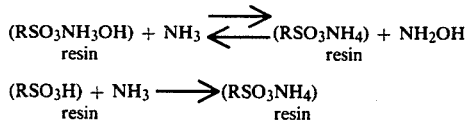

$$(RSO_3NH_3OH) + NH_3 \rightleftarrows (RSO_3NH_4) + NH_2OH \quad (3)$$
$$\text{resin} \qquad\qquad\qquad \text{resin}$$

$$(RSO_3H) + NH_3 \longrightarrow (RSO_3NH_4) \quad (4)$$
$$\text{resin} \qquad\qquad \text{resin}$$

The apparent ionic selectivity of a sulfonic acid ion exchange resin for hydroxylamine versus ammonia is governed by the pH of the solution. At pH below about 4 both hydroxylamine and ammonia are fully protonated and compete on about equal terms for the resin ion exchange sites according to equation (1). Accordingly, such pH is preferred in the present process. Feeding of the resin at pH below about 4 results in hydroxylammonium ion replacing ammonium ions from the resin with the greatest efficiency possible.

At pH above about 4 some of the hydroxylamine remains as uncharged free base to an extent which can be calculated using the base dissociation constant of hydroxylamine which is about $7 \times 10^{-8}$ at 25° C. at the ionic strength of the technical mixtures resulting from the Raschig process. To the extent that hydroxylamine is uncharged it does not compete with ammonium ions for resin ion exchange sites resulting in a decrease of the apparent selectivity of the resin for hydroxylamine versus ammonia. However, the uncharged hydroxylamine can enter the aqueous phase contained in the gel structure of the resin to a much greater extent than ammonium or hydroxylammonium ions which are excluded because of the Donnan exclusion principle. The net result is that while at pH below about 4 the only process by which hydroxylamine is taken up on the resin is ion exchange, at higher pH values the efficiency of the ion exchange process decreases and at the same time some of the unchanged hydroxylamine is held within the gel volume of the resin bed. The shift away from ion exchange is gradual and does not become significant until pH about 5 or higher. At about pH 7, the ion exchange process becomes only marginally effective for purification of hydroxylamine and a pH below about 5 is preferred for the solution fed into the cation exchange resin bed.

The apparent ionic selectivity of an acid resin for hydroxylamine versus ammonia can be determined by allowing the resin to equilibrate with a solution of hydroxylammonium and ammonium salts at a given pH and determining the composition of the solution and of the resin after first washing the resin with water. Washing ensures that no hydroxylamine or ammonia is held within the gel volume of the resin.

Dowex 50W-X8 20 ml, in ammonium form was equilibrated at 25° C. with 25 ml of an aqueous solution 4.78 N in ammonium sulfate and 1.92 N in hydroxylammonium sulfate, in which the pH had been adjusted to the desired test value with 14 N aqueous ammonium or 18 N sulfonic acid. The resin was then separated from the solution, washed well with water and the hydroxylamine and ammonia remaining in solution were determined.

The results of a series of experiments conducted in this manner at room temperature are shown in Table I, wherein "Selectivity" designate the ratio of hydroxylamine to ammonia remaining in the resin versus said ratio left in solution.

When a solution of hydroxylammonium and ammonium salts at pH between about 4 and about 7 is passed through a sulfonic acid resin in the ammonium form, part of the hydroxylammonium ions will be retained by ion exchange with ammonium ions and part of the uncharged hydroxylamine will be retained relative to ammonium ions because of ion exclusion.

Washing of the resin with aqueous ammonia solution in an amount approximately equivalent to the amount of the ionically held hydroxylammonium ions will dislodge said ions (as uncharged hydroxylamine) which will then occupy the gel volume as discussed above. Subsequent washing of the resin with water will remove the hydroxylamine from the gel volume as a more or less distinct band. Thus during the elution steps hydroxylamine retained on or in the resin by either mechanism is eventually removed.

TABLE I

| Apparent Ionic Selectivity versus pH ||
| pH | Selectivity |
| --- | --- |
| 2.2 | 0.92 |
| 3.5 | 0.87 |
| 4.2 | 0.91 |
| 5.1 | 0.93 |
| 6.0 | 0.74 |
| 6.6 | 0.53 |
| 6.7 | 0.48 |
| 6.9 | 0.34 |
| 7.5 | 0.20 |
| 7.9 | 0.11 |

It is thus seen that at the intermediate pH range of 4–7 both ion exchange and ion exclusion are manifested upon feeding of the solution to the resin.

It should be noted that at the lower pH range ion exchange is the main mechanism for holding hydroxylamine in the resin, while at the high pH range ion exclusion retention in the gel volume is the main mechanism by which hydroxylamine is retained by the resin and comparatively little ammonia is needed for elution.

When a feed solution containing hydroxylammonium sulfate, ammonium sulfate and sulfuric acid is passed continuously through a column of the ammonium sulfonate resin, hydroxylammonium ion is retained by the resin until the breakthrough point is reached. This first method of loading of the resin to the breakthrough point represents the maximum amount of hydroxylammonium ions that may be quantitatively removed by the resin from the feed solution. Passage of feed solution through the resin after that point represents a second method of loading and causes hydroxylammonium ions to appear in the effluent at progressively larger concentrations until the mole-fraction of hydroxylammonium ion in the effluent approaches the mole-fraction of hydroxylammonium ion in the feed solution. The resin at that point is essentially at equilibrium with the feed solution and the loading represents the equilibrium capacity of the resin for hydroxylammonium ion in the presence of excess feed solution.

Both the loading to breakthrough and the loading to equilibrium are strongly influenced by the relative concentrations of hydroxylammonium ion, ammonium ion and proton in the feed solution as a consequence of equations (1) and (2). In a technical solution obtained via the Raschig process the equivalent ratio of hydroxylammonium ion to ammonium ion is from 0.3 to 0.5 and hydroxylammonium ion to proton from 0.5 to 1.

Consideration of the two methods of loading noted above leads to two different methods for isolating hydroxylammonium cation from a mixture with other cations. The first method of isolation is employed when a maximum percentage recovery of hydroxylammonium cations contained in a feed solution is desired. Then, the total amount of cations fed through the column must be equal to or less than the amount represented by the breakthrough point.

In the second process, maximum output of hydroxylamine for a given column is desired. Then, the total amount of cations fed through the column may be increased far beyond the breakthrough point so that a higher loading of the column, close to the equilibrium capacity, may be obtained. Because the second method produces a spent feed solution which still significant amounts of hydroxylammonium cation, it is practicable only when this solution can be subsequently utilized. Fortunately, there is a chemical process of industrial importance utilizing hydroxylamine in which the concentration of the hydroxylamine is not critical. This process is the synthesis of oximes by the reaction of hydroxylamine with aldehydes or ketones, and especially, the synthesis of cyclohexanone oxime which is a key intermediate in the manufacture of nylon-6.

In the case that a partial recovery of hydroxylammonium cation is acceptable, the second method of loading and isolation has several advantages: Because of the higher loading of the resin, a smaller amount of resin is required for a given output of hydroxylamine. For the same reason, the hydroxylamine solution obtained upon elution with ammonia according to the second method is generally more concentrated than the solution obtained by method A. Furthermore, it is possible to obtain essentially ammonia-free hydroxylamine solutions by utilizing a slight deficiency of ammonia (90 to 95 mole percent) during the elution by aqueous base solution. This expedient obviates the necessity for a later separation of ammonia from the hydroxylamine solution. The small amount of hydroxylamine remaining on the resin is eluted with the spent feed solution during the next cycle. Since that solution is to be used as a hydroxylamine source in a subsequent process, for instance, oximation of cyclohexanone, no net loss of hydroxylamine is incurred. It will be appreciated that this expedient is not possible in the first method of loading and isolation, because in that case, any hydroxylamine left on the column would be lost for practical purposes.

In calculating the amount of ammonia necessary for elution of hydroxylammonium cation from the column according to the process of the present invention, it is important to take into account the presence of protons on the resin. These take precedence over hydroxylammonium cation in consuming ammonia. The number of protons on the resin is a function of the mole fraction of protons in the feed solution. However, an ammonium sulfonate resin has relatively low affinity for protons relative to hydroxylammonium ions. If complete removal of hydroxylamine from the resin is desired, the amount of ammonia used must be equivalent to or slightly in excess of the sum of hydroxylammonium ions and protons loaded on the resin. The hydroxylamine solution obtained in this case will contain small amounts of ammonia which can be eliminated by evaporation or fractional distillation. If hydroxylamine essentially free of ammonia is desired directly from the resin, the amount of ammonia used must be equivalent to the sum of the protons and of about 90 to 95 mole percent or less of the hydroxylammonium ions loaded on the resin.

As mentioned earlier, ions which do not occupy exchange sites of the resin must be removed by washing with water, prior to elution by aqueous base solution. We have found that under certain conditions little or no washing of the sulfonic resin is necessary between the loading phase and the passing of aqueous ammonia solution. This is the case, for example, when columns longer than about 50 cm are used and the feed solutions are passed through the resin at linear velocities lower than about 5 cm/min. However, a final water wash of the resin is necessary after the aqueous base solution (such as aqueous ammonia) is passed through the resin.

We have observed that the ammonium ions that are displaced by hydroxylammonium ions during the loading half-cycle first appear in the effluent after about 0.3 bed volumes of effluent have been collected from the moment that hydroxylammonium cation containing solution is introduced to the resin column. A bed volume is the geometric volume occupied by a resin bed or column. On the other hand, the hydroxylamine that is displaced by ammonia during the elution half-cycle first appears in the effluent after about 0.7 bed volumes of effluent have been collected from the moment that the ammonia solution is introduced to the resin column. The net effect is that the ammonium ion containing effluent is effectively separated from the hydroxylamine containing effluent without need of an intermediate water wash. In a continuous operation the ammonium ion displaced from the bed, appearing in the effluent of a given cycle, will be mixed with the hydroxylamine containing effluent of the preceding cycle, unless a sufficient water wash is used between the two cycles. These effects can be explained as follows. A resin bed contains three distinct volume elements:

(a) The geometric bed volume, which is defined as 1.0 bed volume.
(b) The free volume which is the volume of water between the resin beads and is equal to about 0.3 bed volume.
(c) The gel volume, which is the volume of water contained in the gel structure of the resin beads and is equal to about 0.4 bed volume.

Ionic species are excluded from the gel volume of the resin by the Donnan exclusion phenomenon as described in "Ion Exchange" by F. Helfferich, McGraw Hill, New York, 1962, pp. 125–151, 431–434. As a result the void volume for ions is only the free volume of the resin, i.e. 0.3 bed volume. Hydroxylamine, however, being a neutral molecule has ready access to the gel volume as well as the free volume, i.e. the resin has an apparent void volume for hydroxylamine equal to about 0.7 bed volume.

In the following examples the term "Hydrox" refers to a mixture containing hydroxylammonium sulfate, ammonium sulfate and sulfuric acid, plus minor amounts of the corresponding nitrates. These examples are given for illustrative purposes and to set forth the best mode contemplated by us of carrying out our invention and are not to be construed as limiting the scope of the invention.

EXAMPLE 1

As illustration of the loading of a typical ammonium sulfonate resin such as Dowex 50W-X8 (trademark of Dow Chemical Corp.) in the ammonium form is shown in Table 1. The resin was placed to a depth of 186 cm in a column of 1.5 cm inner diameter.

The resin bed had a volume of 328 ml. and an exchange capacity equal to 649 milliequivalents. A feed solution representative of Raschig process, 1.78 normal in hydroxylammonium cation, 4.72 normal in ammonium cation and 1.936 normal in proton (all as sulfates) was passed at 50° C. through the column at 7.4 ml./min. A forecut was collected until the effluent became acidic to bromothyenol blue, then effluent cuts, 20 ml. each, were taken and analyzed for hydroxylammonium cation, ammonium cation and protons.

TABLE 2

Loading of Dowex 50W-X8 with Hydroxylamine[a]

| Cut No.[b] | Cumulative Cations[c] mequiv. | % NH$_3$OH$^+$[d] | Cations Retained[e], mequiv NH$_3$OH$^+$ | H$^+$ |
|---|---|---|---|---|
| 1 | 6.16 | 0 | 1.30 | 1.41 |
| 2 | 28.7 | 0 | 6.06 | 6.59 |
| 3 | 75.6 | 0 | 15.9 | 16.1 |
| 4 | 150 | 0 | 31.6 | 24.9 |
| 5 | 251 | 0 | 53.1 | 27.8 |
| 6 | 380 | 0 | 80.2 | 32.7 |
| 7 | 530 | 0 | 112 | 34.5 |
| 8 | 690 | 20.5 | 139 | 36.1 |
| 9 | 852 | 39.8 | 159 | 37.4 |
| 10 | 1017 | 58.0 | 174 | 37.8 |
| 11 | 1188 | 71.5 | 184 | 38.9 |
| 12 | 1357 | 84.2 | 190 | 40.0 |
| 13 | 1528 | 88.3 | 194 | 40.8 |
| 14 | 1699 | 93.0 | 196 | 41.4 |
| 15 | 1871 | 97.5 | 197 | 42.4 |
| 16 | 2042 | 97.9 | 198 | 42.9 |
| 17 | 2196 | 98.3 | 199 | 42.3 |

[a]Capacity of resin and composition of feed solution described in the text.
[b]Each cut consisted of 20 ml.
[c]The sum of NH$_3$OH$^+$, and NH$_4^+$ and H$^+$ eluted cumulatively.
[d]Mole-fraction of NH$_3$OH$^+$ in the corresponding effluent cut as a percentage of NH$_3$OH$^+$ mole-fraction in the feed solution.
[e]Cations retained by the resin cumulatively.

Table 2 shows the mole fraction of hydroxylamine cation in each cut as a percentage of the mole fraction in the feed solution and the accumulated amount of hydroxylammonium cation and protons retained by the column. These quantities are compared with the total amount of cations, that is, hydroxylammonium cation, ammonium cation and protons eluted cumulatively. From Table 2, it can be seen that the retention of hydroxylammonium cation by the column is complete until about 530 milliequivalent of total cation are eluted, at which time hydroxylammonium cation breaks through and the mole fraction increases rapidly at first and then approaches asymptotically the hydroxylammonium cation mole fraction in the feed solution.

As a consequence, hydroxylammonium cation retention increases linearly with total ions eluted up to the breakthrough point at which time about 112 milliequivalents hydroxylammonium cation have been absorbed on the column. Thereafter, the rate of retention declines until the total amount of hydroxylammonium cation approaches asymptotically the value of about 200 milliequivalents which must be considered as the total capacity of the column for hydroxylammonium cation in equilibrium with a large excess of this particular feed solution. Similar tables can be constructed for feed solutions of different compositions and for resins of different exchange properties.

EXAMPLE 2

Synthetic "Hydrox" Solution

A sulfonic acid resin, Amberlite IR-124 (registered trade name of Rohm and Haas Corp.), was packed into a cylindrical glass tube of 1.5 cm. inner diameter to a depth of 186 cm. The tube was jacketed and could be heated or cooled at will by means of circulating water. The volume of the resin was 328 ml. and the total exchange capacity was 939 mequiv. The resin was transformed to the ammonium form by passing one liter of 1 M. aqueous ammonia and then was washed with water.

An aqueous solution, 178 ml., containing 840 mequiv. NH$_4^+$, 317 mequiv. NH$_3$OH$^+$, 345 mequiv. H$^+$ and 1502 mequiv. SO$_4^{2-}$ was passed through the resin, followed by 55 ml. of 4.076 M. (224 mequiv.) aqueous ammonia and 409 ml. of water. The temperature during this operation was maintained at 50° C. and the flow rate at 7.0–7.5 ml./min. The following cuts were collected sequentially.

| Cut | Volume ml. | NH$_3$ + NH$_4^+$ | NH$_2$OH + NH$_3$OH$^+$ (mequiv.) | H$^+$ | SO$_4^{2-}$ |
|---|---|---|---|---|---|
| 1 | 94 | 0 | 0 | 0 | 0 |
| 2 | 308 | 1098 | 120 | 282 | 1500 |
| 3 | 140 | 2.8 | 160 | 0 | 2.8 |
| 4 | 100 | 0.3 | 4.4 | 0 | 0.4 |

It is seen that cut No. 3 contained 50.5% of the total hydroxylamine fed to the resin in essentially pure form and at a relatively high concentration.

EXAMPLE 3

Plant "Hydrox" Solution

The ammonium sulfonate resin used in Example 2 was loaded under the same conditions with an aqueous solution, 178 ml., obtained from a Raschig plant, containing 744 mequiv. NH$_4^+$, 310 mequiv. NH$_3$OH$^+$ and 340 mequiv. H$^+$ present mainly as sulfates with small amount of nitrate ions also present. After the feed solution, 60 ml. of 4.076 N (245 mequiv.) aqueous ammonia were passed followed by 401 ml. of water. The following cuts were collected sequentially.

| Cut | Volume ml. | NH$_3$ + NH$_4^+$ | NH$_2$OH + NH$_3$OH$^+$ mequiv. | H$^+$ | SO$_4^{2-}$ |
|---|---|---|---|---|---|
| 1 | 89 | 0 | 0 | 0 | 0 |
| 2 | 290 | 1020 | 76 | 298 | 1350 |
| 3 | 140 | 1.9 | 173 | 0 | 1.9 |
| 4 | 120 | 0.2 | 9 | 0 | 0.3 |

It is seen that cut No. 3 contained 55.8% of the total hydroxylamine fed to the resin in essentially a pure form and at a relatively high concentration.

EXAMPLE 4

The ammonium sulfonate resin used in Example 2 was loaded under the same conditions with 182 ml. of the same aqueous solution used in Example 3. After the fed solution, 65 ml. of an aqueous solution containing 226 mequiv. hydroxylamine base, 248 mequiv. ammonia, and 14 mequiv. of ammonium ion present as sulfate was passed followed by 392 ml. of water. The following cuts were collected sequentially.

| Cut | Volume ml. | NH$_3$ + NH$_4^+$ | NH$_2$OH + NH$_3$OH$^+$ mequiv. | H$^+$ | SO$_4^=$ |
|---|---|---|---|---|---|
| 1 | 87 | 0 | 0 | 0 | 0 |
| 2 | 288 | 1039 | 90 | 284 | 1411 |
| 3 | 120 | 2.3 | 415 | 0 | 2.3 |
| 4 | 140 | 0.3 | 31 | 0 | 0.3 |

It is seen that cut #3 contained hydroxylamine in essentially a pure form and in a concentration substantially higher than that obtained in Example 2. A 65 ml. portion of cut #3 was charged with 250 mequiv. of anhydrous ammonia to provide a basic solution to be used in a subsequent run similar to the above. Thus the product cut of this run was 55 ml. of containing 190 mequiv. of essentially pure hydroxylamine, or 61.4% recovery.

EXAMPLE 5

A sulfonic acid resin Dowex 50W-X8 (trademark of Dow Chemical Corp.) was placed in a cylindrical glass tube of 1.50 cm. inner diameter to a depth of 186 cm. The volume of the resin was 328 ml. and the exchange capacity 649 mequiv. The resin was transformed to the ammonium form by passing one liter of 1 M aqueous ammonia and then was washed with water. An aqueous solution, 178 ml., containing 840 mequiv. $NH_4^+$, 317 mequiv. $NH_3OH^+$, 345 mequiv. $H^+$ and 1502 mequiv. $SO_4^=$ was passed at 50° C. and at the rate of 7.0–7.5 ml./min. through the resin. This was followed by 48 ml. of 4.93 N (237 mequiv.) aqueous ammonia and 400 ml. of water at the same temperature and flow rate. A 60 ml. cut which was collected shortly after the introduction of ammonia contained 142 mequiv. $NH_2OH+NH_3OH^+$, (44.8% of charge) 1.1 mequiv. $SO_4^-$ and 1.1 mequiv. $NH_4^+$.

EXAMPLE 6

Three-cycle Run

A sulfonic acid resin, Dowex 50W-X8 (trademark of Dow Chemical Corp.) was placed in a cylindrical glass tube of 1.0 cm. inner diameter to a depth of 106 cm. The volume of the resin was 83 ml. of and the capacity 164 mequiv. The resin was transformed to the ammonium form by passing 200 ml. of 1 M aqueous ammonia and then was washed with water.

A 30 ml. aqueous solution containing 142 mequiv. $NH_4^+$, 53 mequiv. $NH_3OH^+$, 58 mequiv. $H^+$ and 253 mequiv. $SO_4^{2-}$ was passed through the resin followed sequentially by 30 ml. of water, 6.0 ml. of 4.216 N (25.3 mequiv.) aqueous ammonia and 30 ml. of water. This cycle was repeated two more times. The temperature during the whole operation was maintained at 50° C. and the flow rate at about 4.4 ml./min. The effluent of the resin was monitored by means of a pH-meter. Alternating acidic and basic fractions were eluted and were collected in separate cuts. Three acidic cuts, pH range 0.6 to 7.0 were collected which had a combined volume of 215 ml. and contained 510 mequiv. $NH_4^-$, 102 mequiv. $NH_3OH^+$, 156 mequiv. $H^+$ and 768 mequiv. $SO_4^=$. Three basic cuts, pH range 7.0 to 8.5 were collected which had a combined volume of 70 ml. and contained 55 mequiv. of hydroxylamine, with only traces of ammonia and $SO_4^{2-}$, corresponding to 34.5% recovery of the hydroxylamine charged.

EXAMPLE 7

Three Cycle Run with Recycle

The operation of Example 5 was repeated up to the first cycle inclusive. Four fractions were collected during this cycle labeled as follows (the subscript indicates the number of cycle).

$A_1$, acidic cut, 59 ml.
$AT_1$, acid tailings, up to pH 6
$B_1$, basic cut, 20 ml.
$BT_1$, basic tailings, up to pH 6

In subsequent cycles the charge sequence was the following: 30 ml. of feed solution of the composition given in Example 6 followed by the acid tailings of the previous cycle, 20 ml. water, then 6.0 ml. of 4.216 N (25.3 mequiv.) aqueous ammonia followed by the basic tailings of the previous cycle, and finally 20 ml. of water. The average composition of a basic cut (20 ml.) after the first cycle was 19.4 mequiv. $NH_2OH+NH_3OH^+$, 0.2 mequiv. $SO_4^=$ and 0.2 mequiv. $NH_3+NH_4^+$. This represented a 36.6% recovery of essentially pure hydroxylamine in relatively high concentration.

EXAMPLE 8

A sulfonic acid resin, Dowex 50W-X8 (trademark of Dow Chemical Corp.) was placed in a cylindrical glass tube of 1.0 cm. inner diameter to a depth of 53 cm. The volume of the resin was 42 ml. and the capacity 83 mequiv. The resin was transformed to the ammonium form by passing 100 ml. of 1 N aqueous ammonia and then was washed with water.

A 4 liter solution containing 15 mequiv. $NH_4^+$, 15 mequiv. $NH_3OH^+$, 17 mequiv. $H^+$ and 47 mequiv. $SO_4^{2-}$ was passed at 60° C. through the resin at the rate of 11–14 ml./min. The resin was then washed with 50 ml. of water, cooled to 30° C., and 9.5 ml. of 4.216 N (40 mequiv.) aqueous ammonia were sent through at the rate of 2.4 ml./min. followed by 50 ml. of water at the same rate. The cut that was collected after the introduction of aqueous ammonia had a volume of 50 ml. and contained 7.04 mequiv. $NH_3$ and 14.25 mequiv. $NH_2OH$, or 95% of the hydroxylamine charged. A 45 ml. aliquot of this cut was subjected to evaporation under reduced pressure in a rotary evaporator in order to remove $NH_3$. When about 15 ml. had distilled off, the residue was acidified to pH 3.6 with $H_2SO_4$, then water was flashed off and the dry residue was triturated with absolute ethanol, filtered and dried. The white crystals collected consisted of pure $(NH_3OH)_2SO_4$ and weighed 0.829 g, or 75% recovery based on hydroxylamine charged. The yield difference between the hydroxylamine eluted from the column and the hydroxylamine sulfate isolated in crystalline form is due to the partial evaporation of hydroxylamine in the rotary evaporator. This can be largely avoided by the use of fractional distillation instead of a single-plate evaporation.

EXAMPLE 9

Carboxylic Acid Resin

A carboxylic acid resin, Amberlite IRC-50 (trademark of Rohm and Haas Corp.) was transformed to the ammonium form by treatment with excess aqueous 2 M ammonia and then was loaded to a cylindrical glass tube of 4.4 cm. inner diameter to a depth of 44 cm. The volume of the resin was 670 ml. and the exchange capacity about 2300 mequiv. An aqueous solution, 175 ml. containing 586 mequiv. $(NH_3OH)_2SO_4$ and 294 mequiv. $(NH_4)_2SO_4$ was passed through the resin followed sequentially by 725 ml. of water, 175 ml. of 4 M aqueous ammonia and 825 ml. of water. The temperature during this operation was about 25° C. and the flow rate about 11 ml./min. A 1 liter basic cut was collected which contained 58 mequiv. $NH_3$, 339 mequiv. $NH_2OH$ and no $SO_4^{2-}$. This represents 57.8% recovery of hydroxylamine charged.

We claim:

1. A process for separating hydroxylamine, under conditions suitable for ion exchange of hydroxylammonium ion from aqueous solution having a pH not above about 7 containing hydroxylammonium salts in mixture with salts of cations whose corresponding bases have base dissociation constants greater than $10^{-7}$ comprising the following steps:
(a) contacting said solution with a cation exchange resin loaded with monovalent cations thereby removing from the solution at least some of the hydroxylammonium ions by exchange with cations originally present on said resin
(b) contacting said resin with an aqueous solution of a monovalent amine or hydroxide base of at least 0.5 molar concentration having a base dissociation constant greater than $10^{-7}$ thereby preferentially removing hydroxylamine from the resin.

2. The process as set forth in claim 1 wherein the aqueous solution containing hydroxylammonium salts are in mixture with essentially ammonium sulfate and sulfuric acid.

3. The process as set forth in claim 1 wherein the cation exchange resin is a sulfonic acid resin.

4. The process as set forth in claim 1 wherein the cation exchange resin is initially in the ammonium form.

5. The process as set forth in claim 1 wherein the aqueous solution of a monovalent amine or hydroxide base is an aqueous ammonia solution.

6. The process as set forth in claim 5 comprising the additional step, subsequent to said contact of the resin with aqueous ammonia solution, of passing water through said resin for obtaining sequentially an acidic effluent substantially depleted of hydroxylammonium sulfate and correspondingly enriched in ammonium sulfate and a basic effluent containing hydroxylamine essentially free of salts.

7. The process as set forth in claim 6 wherein a first effluent fraction is substantially depleted of hydroxylamine and a second effluent fraction contains. essentially pure hydroxylamine.

8. The process as set forth in claim 1 wherein the aqueous solution of a monovalent amine or hydroxide base is at least 1 molar.

9. The process as set forth in claim 1 wherein the aqueous solution of a monovalent amine or hydroxide base contains dissolved hydroxylamine.

10. The process as set forth in claim 9 wherein the dissolved hydroxylamine is supplied from the hydroxylamine preferentially removed from the resin.

11. The process as set forth in claim 1 wherein the cations originally present on said resin are essentially the same as in the aqueous solution containing hydroxylammonium salts.

12. The process as set forth in claim 1 wherein the aqueous solution has a pH not above about 5.

13. A process as set forth in claim 1 wherein the solution temperature is between about room temperature and 80° C.

14. A process as set forth in claim 1 wherein the solution temperature is between about 35° C. and 65° C.

15. A cyclic process for separating hydroxylamine, under conditions suitable for ion exchange of hydroxyl ammonium ion, from aqueous solutions having a pH not above about 7 containing essentially hydroxylammonium sulfate and nitrate, ammonium sulfate and nitrate, and sulfuric acid comprising the following steps:
(a) passing said solutions through a sulfonic acid resin bed loaded predominantly with ammonium ions;
(b) passing through said resin bed an aqueous solution containing essentially ammonia and hydroxylamine;
(c) passing through said resin bed water and regenerating said resin bed to provide the bed for step (a) of the next cycle;
(d) concurrently with steps (a), (b) and (c) collecting a first effluent fraction substantially depleted of hydroxylammonium ion and correspondingly enriched in ammonium ion and a second effluent fraction containing essentially pure hydroxylamine;
(e) mixing part of said second effluent fraction with ammonia or an ammonia containing aqueous solution and recycling the resulting solution to step (b) of the next cycle.

16. The process as set forth in claim 15 wherein the aqueous solutions have a pH not above about 5.

* * * * *